US009594762B2

(12) United States Patent
Chakra et al.

(10) Patent No.: US 9,594,762 B2
(45) Date of Patent: Mar. 14, 2017

(54) INTELLIGENT FILE MANAGEMENT

(75) Inventors: Al Chakra, Apex, NC (US); Itzhack Goldberg, Hadera (IL); John Rice, Waterford (IE)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 13/345,346

(22) Filed: Jan. 6, 2012

(65) Prior Publication Data
US 2013/0179479 A1 Jul. 11, 2013

(51) Int. Cl.
*G06F 12/00* (2006.01)
*G06F 17/30* (2006.01)
*G06F 11/30* (2006.01)

(52) U.S. Cl.
CPC .... *G06F 17/30115* (2013.01); *G06F 11/3089* (2013.01); *G06F 2201/865* (2013.01)

(58) Field of Classification Search
CPC . G06F 8/68; G06F 9/4443; G06F 8/61; G06F 11/3419; G06F 11/3466; G06F 9/455; G06F 8/65; G06F 9/45504; G06F 9/45529
See application file for complete search history.

(56) References Cited

U.S. PATENT DOCUMENTS

| | | | |
|---|---|---|---|
| 5,535,375 A * | 7/1996 | Eshel et al. | 703/27 |
| 5,819,273 A * | 10/1998 | Vora et al. | |
| 6,694,339 B1 * | 2/2004 | Hirose et al. | |
| 7,136,885 B2 * | 11/2006 | Wright, Jr. | G06F 3/0605 |
| 7,409,405 B1 * | 8/2008 | Masinter et al. | |
| 7,801,867 B2 * | 9/2010 | Mittal et al. | 707/686 |
| 7,831,561 B2 | 11/2010 | Wertheimer et al. | |
| 7,979,416 B1 * | 7/2011 | Santry et al. | 707/706 |
| 8,099,445 B1 * | 1/2012 | Masinter et al. | 707/822 |
| 8,510,295 B1 * | 8/2013 | Dayan et al. | 707/723 |
| 2002/0105681 A1 * | 8/2002 | Iyoki | 358/442 |
| 2003/0005133 A1 * | 1/2003 | Banerjee et al. | 709/229 |
| 2004/0181691 A1 * | 9/2004 | Armingaud et al. | 713/201 |
| 2004/0225690 A1 | 11/2004 | Arkeketa et al. | |
| 2006/0136446 A1 * | 6/2006 | Hughes et al. | 707/101 |
| 2007/0033635 A1 * | 2/2007 | Hirsave et al. | 726/1 |
| 2008/0034003 A1 | 2/2008 | Stakutis et al. | |
| 2008/0229428 A1 * | 9/2008 | Camiel | 726/27 |
| 2009/0138109 A1 * | 5/2009 | Park | 700/94 |
| 2009/0240654 A1 * | 9/2009 | Limber et al. | 707/1 |
| 2009/0271586 A1 * | 10/2009 | Shaath | 711/163 |
| 2010/0217751 A1 * | 8/2010 | Ciubotaru | G06F 17/30117 707/650 |
| 2010/0299187 A1 * | 11/2010 | Duggal | 705/14.1 |

(Continued)

*Primary Examiner* — Tuan A Pham
(74) *Attorney, Agent, or Firm* — Shumaker & Sieffert, P.A.

(57) ABSTRACT

In one example, an indication is detected that an application has performed a file operation on a file and a computing system determines whether a datastore includes an association between an application identifier that identifies the application and a file identifier that identifies the file. If not, the association between the application identifier and the file identifier is stored. A computing system also determines whether execution behavior of the application changes when the file is not accessible to the application. Responsive to a change in execution behavior of the application, a status indicator is associated with the file identifier to indicate that the execution behavior of the application changes when the file is not accessible to the application.

20 Claims, 4 Drawing Sheets

(56) References Cited

U.S. PATENT DOCUMENTS

2010/0306175 A1* 12/2010 Johnson et al. ............. 707/663
2011/0137963 A1*  6/2011 Hoang et al. ................ 707/822
2013/0007074 A1*  1/2013 Weicher ....................... 707/821

* cited by examiner

INTELLIGENT FILE MANAGEMENT

BACKGROUND

This disclosure relates to the management of data on computing devices. Data stored on computing devices may be organized into computers files. In some instances, computer files may be data structures that organize data for easy management and modification by computing devices. The proliferation of computing devices has contributed to a substantial increase in the growth rate of data, and therefore the number computer files used to organize such data. Consequently, storage and energy costs have continued to increase as greater quantities of storage space are required to store the increasing amounts of data. Moreover, the complexity of managing computer files has increased accordingly with the increasing amounts of data. In some instances, the significance of a computer file to applications and/or users may vary depending on how the computer file is used by such applications and/or users. Thus, some computer files may be more suitable for removal from a computing device than others when purging or deleting computer files from a computing device.

BRIEF SUMMARY

In one example, a method includes detecting a file operation indication that an application executing on a computing device has performed a file operation on a file. The method also includes determining, by the computing device, whether a datastore includes an association between an application identifier that identifies the application and a file identifier that identifies the file. The method further includes storing in the datastore, by the computing device, the association between the application identifier and the file identifier when the datastore does not include the association. The method also includes, determining, by the computing device, whether execution behavior of the application changes when the file is not accessible to the application, in response to storing the association in the datastore. The method further includes, associating, by the computing device, a status indicator with the file identifier to indicate that execution behavior of the application changes when the file is not accessible to the application, when the execution behavior of the application changes.

In one example, a computing device includes one or more processors. The computing device also includes a monitoring module executable by the one or more processors to detect a file operation indication that an application executing on a computing device has performed a file operation on a file. The computing device also includes a file management module executable by the one or more processors to determine whether a datastore includes an association between an application identifier that identifies the application and a file identifier that identifies the file. The file management module is executable by the one or more processors to store in the datastore the association between the application identifier and the file identifier when the datastore does not include the association. The file management module is further executable by the one or more processors to determine, in response to storing the association in the datastore, whether execution behavior of the application changes when the file is not accessible to the application. The file management module is also executable by the one or more processors to associate a status indicator with the file identifier to indicate that the execution behavior of the application changes when the file is not accessible to the application, when the execution behavior of the application changes.

In one example, a computer program product includes a computer-readable storage medium having computer-readable program code embodied therein, the computer-readable program code including computer-readable program code to detect a file operation indication that an application executing on a computing device has performed a file operation on a file. The computer-readable program code further includes computer-readable program code to detect a file operation indication that an application executing on a computing device has performed a file operation on a file. The computer-readable program code also includes computer-readable program code to determine whether a datastore includes an association between an application identifier that identifies the application and a file identifier that identifies the file. The computer-readable program code also includes computer-readable program code to store in the datastore the association between the application identifier and the file identifier when the datastore does not include the association. The computer-readable program code also includes computer-readable program code to determine, in response to storing the association in the datastore, whether execution behavior of the application changes when the file is not accessible to the application. The computer-readable program code also includes computer-readable program code to associate a status indicator with the file identifier to indicate that the execution behavior of the application changes when the file is not accessible to the application, when the execution behavior of the application changes.

The details of one or more embodiments are set forth in the accompanying drawings and the description below. Other features, objects, and advantages will be apparent from the description and drawings, and from the claims.

DETAILED DESCRIPTION

Figure 1:
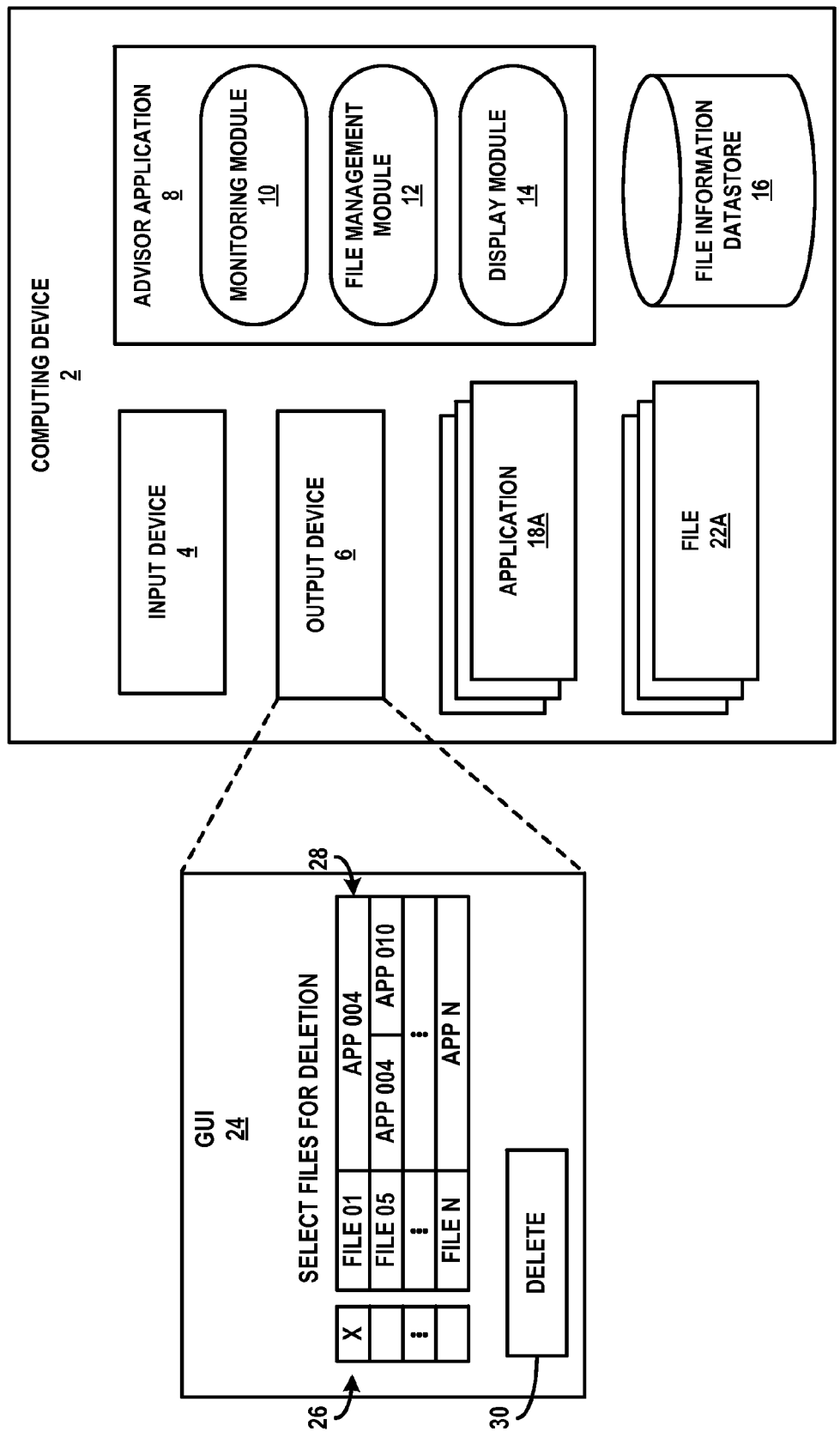
FIG. 1 is a block diagram illustrating a computing device that implements techniques of the present disclosure, in accordance with one or more aspects of the present disclosure.

Techniques of the disclosure proactively manage computer files stored on a computing device to provide a user or automated agent with information that is usable to determine which files are suitable for deletion. For instance, in accordance with techniques of the disclosure, an advisor application executing on a computing device monitors file operations performed on files by various applications of the computing device. In some examples, file operations include creating and/or modifying a file. When the advisor application determines that an application has performed a file operation on a file, the advisor application generates an association between the application and the file. The advisor application stores the association in a datastore. In this way, the advisor application maintains information that describes the relationships of each file and application that has created or modified the file.

In some examples, the advisor application also determines whether the execution behavior of an application changes when a file that has been created or modified by the application is not accessible to the application. In this way, the advisor application is able to determine whether deleting the file from the computing device affects the execution behavior of the application. For instance, the advisor application simulates an application executing without access to a file that the application has created or modified. If the execution behavior of the application changes when the application cannot access the file (e.g., the application issues an error or other notification), the advisor application associates a status indicator with a file identifier that identifies the file. The status indicator indicates that the execution behavior of the application changes when the file is not accessible to the application. Thus, status indicators included in the datastore indicate whether each file, if deleted, affects the execution behavior of applications on the computing device.

In one example, a user or automated agent determines that more storage space is needed on the computing device or that deletion of unnecessary files has been requested. In such examples, the advisor application queries the datastore to select a subset of files that, if deleted, do not change the execution behavior of applications on the computing device. For instance, the advisor application queries status indicators associated with file identifiers in the datastore to determine whether execution behavior of an application changes if a file associated with the application is not accessible to the application. Consequently, the advisor application returns a subset of all files represented in the datastore. The subset of files provided to the user or automated agent includes files associated with status indicators that indicate execution behavior of applications will not change if files included in the subset of files are not accessible to the applications.

Techniques of the present disclosure may provide one or more advantages. For instance, techniques of the disclosure may enable non-technical users to safely clean up files on storage drives without removing important and/or system required files that would change execution behavior of applications. By proactively tracking which applications perform file operations on each file, techniques of the present disclosure may provide for granular file management and deletion. Moreover, by simulating whether a file can be safely deleted from a computing device, techniques of the disclosure provide useful information to the user to make informed decisions about which files are suitable for deletion. In this way, user effort to clean up and delete files may be reduced thereby lowering storage costs and/or energy consumption of storage devices.

FIG. 1 is a block diagram illustrating an example computing device 2 that implements techniques of the present disclosure. As shown in FIG. 1, computing device 2 includes components, such as an input device 4, output device 6, advisor application 8, file information datastore 16, applications 18, and files 22. Advisor application 8, in some examples, includes monitoring module 10, file management module 12, and display module 14. Each of the components as shown in FIG. 1 is operably coupled to enable communication between the respective components.

Figure 2:
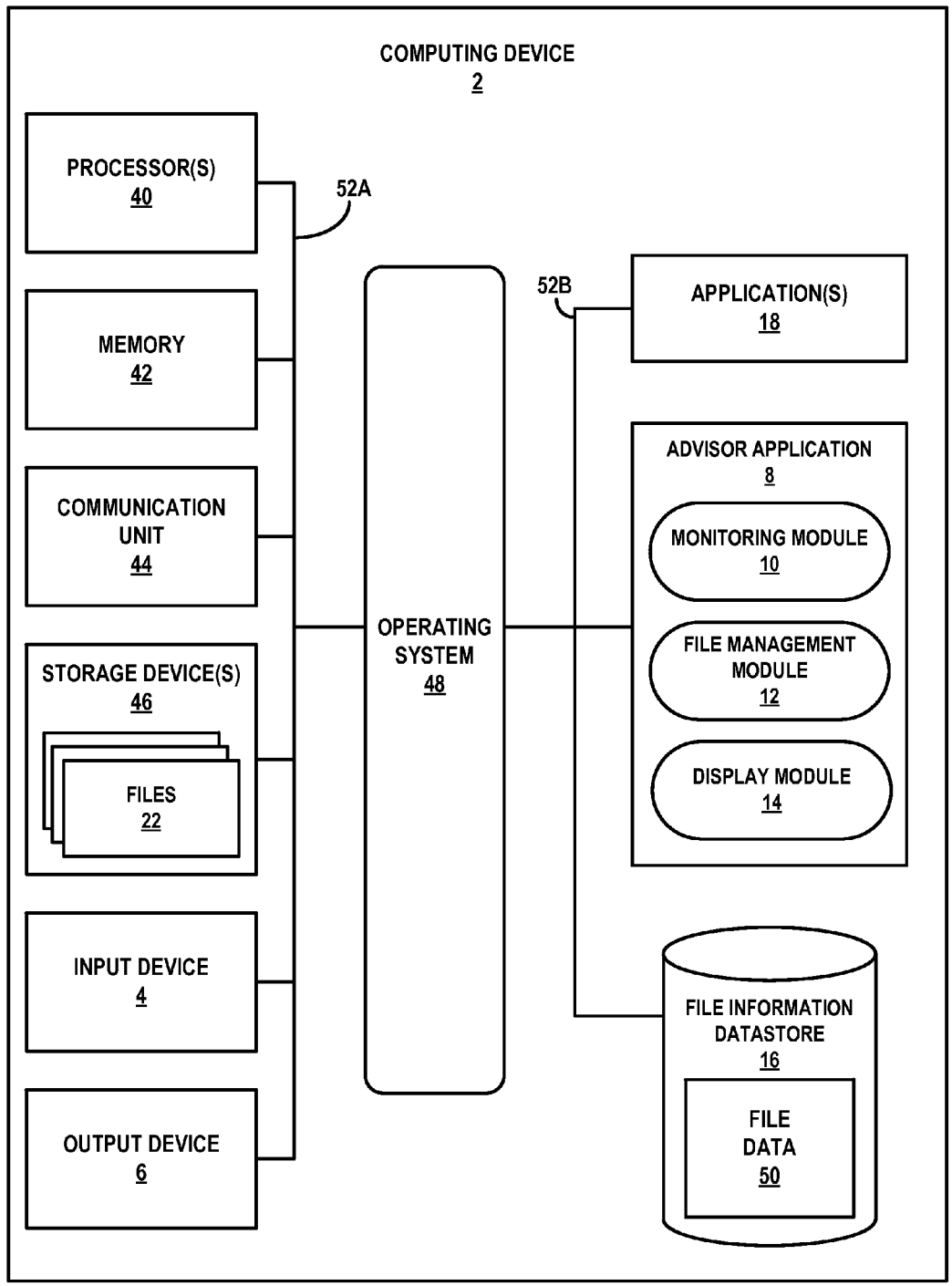
FIG. 2 is a block diagram illustrating further details of one example of a computing device shown in FIG. 1, in accordance with one or more aspects of the present disclosure.

In accordance with aspects of the disclosure, examples of computing device 2 include, but are not limited to, portable or mobile devices such as mobile phones (including smart phones), laptop computers, personal digital assistants (PDAs), portable gaming devices, portable media players, e-book readers, servers, mainframes or other computing devices. Computing device 2, as shown in FIG. 1, includes additional components not illustrated in FIG. 1, such as one or more processors, memory, network interface, storage device, etc. FIG. 2 further illustrates additional components that may be included in computing device 2.

Computing device 2 as shown in FIG. 1, includes input device 4. Input device 4 may include a keyboard, pointing device, microphone, and/or camera capable of recording one or more images or video. Computing device 2 also includes an output device 6. Examples of output device 6 may include a video graphics card, computer display, sound card, and/or speakers. Input device 4 and output device 6 are further illustrated in FIG. 2.

As shown in FIG. 1, computing device 2 includes one or more applications, such as application 18A. Applications may be one or more processes or threads that are executable by computing device 2. Applications, in some examples, perform file operations on files, such as creating, modifying, reading, and/or deleting files. Examples of application 18A include, but are not limited to, word processor applications, spreadsheet applications, presentation applications, web browser applications, multimedia applications, graphical design applications, database applications, operating systems, and the like. More generally, application 18A includes any process or thread capable of performing file operations on files, such as file 22A.

Files, such as file 22A, as shown in FIG. 1, may include any data structures that organize data for management and/or modification via file operations performed by applications. Thus, some examples of files include, but are not limited to, Hypertext Markup Language files, log files, dynamically and/or statically linked library files, word processor files, multimedia files, and the like. In some examples, files are organized in directories that are further maintained by an operating system executing on computing device 2 (e.g., operating system 48 as shown in FIG. 2). In one example, application 18 performs a file operation on file 22 by modifying the data organized in file 22 and saving modified file 22A on computing device 2. In some examples, one or more files may be stored on a remote computing device that is operably coupled to computing device 2 by a communication channel, such as a network or other channel to communication information.

As previously stated, computing device 2 includes advisor application 8 that implements techniques of the present disclosure and may include monitoring module 10, file management module 12, and display module 14, as shown in FIG. 1. Each of modules 10, 12, and 14 includes data and/or instructions that are executable by computing device 2 to perform operations of the various modules.

Monitoring module 10, in some examples, monitors file operations performed by applications on files. For instance, monitoring module 10 determines that application 18A has performed a file creation operation to create file 22A. In other examples, monitoring module 10 determines that application 18A has performed a file modification operation to modify file 22A.

To monitor file operations performed by applications, monitoring module 10 may be integrated with an operating system component, such as file system module that manages a file system on computing device 2. In one example, Application Programming Interfaces (APIs) of the file system module includes function calls that are invoked by applications to perform file system operations. For example, an API of the file system module provides a function call to create a file. In some examples, advisor application 8 modifies the file system module to insert an event hook in a function call provided by the file system module. The event hook includes instructions that, when executed by computing device 2, cause the file system module to send an indication, such as a file operation indication, to monitoring module 10 that indicates the function call has been invoked by an application. For instance, application 18A may invoke a function call of a file system module to create file 22A. The function call may include an event hook that, when executed, sends an indication to monitoring module 10 that indicates the function call has been invoked by an application. In some examples, the indication indicates a file identifier that identifies file 22A and an application identifier that identifies application 18A. In an alternative example, monitoring module 10 may be implemented directly in application 18A. In such examples, each application monitors file operations performed by the respective application on files.

In some examples, monitoring module 10 receives an indication that an application executing on computing device 2 has performed a file operation on a file and communicates the indication to file management module 12. In some examples, file management module 12 uses the indication to determine whether file information datastore 16 includes an association between a file identifier that identifies the file and an application identifier that identifies the application that performed the file operation on the file. For instance, if the indication indicates that application 18A performed a modify file operation on file 22A, file management module 12 determines whether file information datastore 16 includes an association between a file identifier that identifies file 22A and an application identifier that identifies application 18A. In one example, file management module 12 performs the determination by comparing a file identifier and/or application identifier included in the indication with file identifiers and/or application identifiers in file information datastore 16 to identify a match.

If file management module 12 determines that file information datastore 16 does not include an association between file 22A and application 18A, file management module 12 stores an association between the application identifier and the file identifier in file information datastore 16. In some examples, file management module 12 further stores information such as the file operation date and/or origin of the file (e.g., a Uniform Resource Locator that indicates the location from which a file was downloaded). In this way, file management module 12 proactively manages relationships between files and application that perform file operations on such files. Consequently, techniques implemented by file management module 12 to store such associations provide knowledge of relationships between files and applications.

File management module 12 further implements techniques of the disclosure that intelligently enable a user or automated agent to determine which files are suitable for deletion. For instance, continuing with the current example, file management module 12, upon storing the association between file 22A and application 18A in file information datastore 16, determines whether execution behavior of application 18A changes when the file 22A is not accessible to the application 18A.

Execution behavior of application 18A may refer to operations of application 18A that occur when instructions that comprise application 18A are executed by computing device 2. For instance, execution behavior of application 18A may change if files relied upon by application 18A for execution are not accessible to application 18A. Thus, in one example, application 18A may provide an indication such as a warning, notification, or error if a file required for execution by application 18A is not accessible. Consequently, execution behavior of application 18A may be said to change when application 18A provides the indication because the file is not accessible to application 18A.

More generally, file management module 12, implementing techniques of the disclosure, simulates whether execution behavior of application 18A changes when a file on which application 18A has performed a file operation is not accessible to application 18A. In this way, file management module 12 may simulate whether a file associated with an application can be deleted without changing execution behavior of application 18A. If execution behavior of application 18A changes when a file associated with application 18A is not accessible to application 18A, file management module 18A may indicate that the file is not suitable for deletion. By simulating whether each file associated with an application can be deleted without changing execution behavior of an application, techniques of the present disclosure provide a proactive and granular file management of file to provide intelligent file deletion and cleanup techniques.

File management module 12 may use numerous, different example techniques to simulate whether execution behavior of application 18A changes when a file is inaccessible. In one example, application 18A performs a file operation on file 22A and therefore is associated with file operation 22A. To simulate whether execution behavior of application 18A changes when file 22A is not accessible to application 18A, file management module 12 may generate a virtual computing environment, e.g., a virtual machine that is the same or similar to an operating environment in which application 18A currently exists. In one example, the operating environment is an operating system. For instance, the virtual computing environment may replicate files, applications and other computing components such that execution behavior of application 18A may be the same in the virtual computing environment as in the current operating environment. In the current example, file management module 12 deletes file 22A from the virtual computing environment (e.g., file 22A is not accessible to application 18A) and subsequently executes application 18A. If file management module 12 determines that execution behavior application 18A in the virtual computing environment differs from execution behavior in the current operating environment, file management module 12 may conclude that execution behavior of application 18A changes when file 22A is not accessible to application 18A.

In an alternative example, file management module 12 simulate whether execution behavior of application 18A changes when file 22A is not accessible by temporarily moving file 22A, changing permissions of file 22A or otherwise causing file 22A to be inaccessible to application 18A. For instance, file management module 12 can terminate application 18A and cause file 22A to be inaccessible to application 18A. File management module 12 can then execute application 18A and detect whether application 18A provides an indication, such as a warning, notification, or error that indicates a notification associated with application 18A. Thus, when file management module 12 causes file 22A to be inaccessible to application 18, file management module 12 can determine whether execution behavior of application 18 changes when file 22A is inaccessible.

In any case, when file management module 12 determines that execution behavior of application 18 changes when file 22A is inaccessible, file management module 12 associates a status indicator the file identifier and/or application identifier that is stored in file information datastore 16. The status indictor indicates that execution behavior of application 18A changes when file 22A is not accessible to the application. For instance, a status indicator may include a value of "NOT DELETABLE" or "0" if execution behavior of application 18A changes when file 22A is not accessible to the application. If execution behavior application 18A does not change when file 22A is inaccessible, file management module 12 may generate a status indicator that indicates the execution behavior of application 18A does not change. For instance, a status indicator can include a value of "DELETABLE" or "1" if execution behavior of application 18A does not change when file 22A is not accessible to the application. File management module 12 then associates the status indicate with the association between the application identifier of application 18A and the file identifier of file 22A that is stored in file information datastore 16.

In the previous example, functionality of file management module 12 was described as being included in advisor application 8. In other examples, individual applications on computing device 2 (e.g., application 18A) include functionality of file management module 12 as described in the previous example. For instance, each application individually maintains a group of file identifiers that identify files on which the respective application has performed file operations. In such examples, an application, upon performing a file operation on a file determines whether execution behavior of the application changes when the file is inaccessible to the application. The application also associates status indicators with the file identifiers maintained by the application that indicate whether execution behavior of the application changes when the file is inaccessible. In this way, each application maintains its own group of files and corresponding status indicators that indicate whether files associated with the application can be deleted.

In some examples, a user wishes to intelligently delete or cleanup files stored on computing device 2. Consequently, the user provides a user input at input device 4 to request to display representations of files for deletion. File management module 12, in response to receiving the request, queries file information datastore 16 to select a subset of the files that may be deleted. In some examples, a selected file in the subset of selected files is associated with a status indicator that indicate that execution behavior of each application associated with the selected file does not change when the selected file is not accessible to the application. Stated another way, file management module 12 queries file information datastore 16 to identify files that, if deleted, do not cause execution behavior of a corresponding application to change.

In one example, file information datastore 16 includes associations between file identifiers, application identifiers, and status indicators. In one example an association associates a file identifier, application identifier and status indicator. The status indicator indicates whether execution behavior of the application identified by the application identifier changes when the file identified by the file identifier is inaccessible to the application. File management module 12 selects file identifiers of those files that are associated with status indicators that indicate execution behavior of applications associated with the file identifies do not change when the files associated with the file identifiers are inaccessible (i.e., deleted). In this way, file management module 12 selects a subset of files that may be deleted without changing execution behavior of applications on computing device 2.

In some examples, file information datastore 16 communicates the file identifiers that identify files in the subset of selected files to display module 14. Display module 14 causes output device 6 to display a graphical user interface (GUI) 24 that includes representations of the files that can be deleted. In some examples, GUI 24 includes representations 28 of files and applications. Representations 28 can include graphical controls such as text boxes, images, etc., that include information such as file identifiers values and application identifier values. Representations 28 can also include a date the file was created or modified, an origin of the file, and/or an application that has performed a file operation on the file. Representations 28 may be associated with selector controls, such as selector control 26. Selector control 26 may be associated with representations 28. When selector control 26 is selected, representation 28 can also be said to be selected. Thus, when selector control 26 is selected in response to a user input, file management module 12 deletes the file associated with the file identifier value included in representation 28. In some examples, a user selects multiple selector controls and subsequently select delete control button 30. In such examples, file management module 12 deletes each of the files of representations associated with selected selector controls. Display module 14 in one example, provides functionality to enable a user to select how to sort the representations, e.g., by file size, file creation date, file origin, etc.

In some examples, as previously described applications, such as application 18A include functionality of monitoring module 10, file management module 12, and/or display module 14. In such examples, advisor application 8 may not manage associations between files, applications and status indicators in file information datastore 16. Rather, in some examples, each application maintains its own group of such associations Each application can further include one or more APIs that enable other applications to query one another when a user or automated agents wishes to delete a file.

In one example, each application maintains associations between the application, files on which the application performs file operations and status indicators. Each application stores and/or manages the associations in a suitable data structure, such as a list, map, table, etc. When a user wishes to determine which files can be deleted, the user provides a user input to advisor application 8. Advisor application 8 sends a query to each application that maintains associations with files via an API and in return receives a group of indications such as file identifiers that identify files. For instance, each application selects a group of file identifiers that are associated with status indicators that indicate execution behavior of the respective application does not change when the files are inaccessible to the application. Upon receiving the groups of file identifiers from the applications, display module 14 causes output device 6 to display representations of the files.

As previously described, advisor application 8 may centrally manage some or all associations between files and application, as described with respect to file information datastore 16. Furthermore, applications may, in some examples, individually store and/or manage some or all associations in suitable data structures that are managed separately by the application, such as a list, map, table, etc. Thus, when a user provides a user input to request files that are deletable, advisor application 8 may query the centralized datastore (e.g., file information datastore 16) and/or the individual data structures that are managed separately by the applications. In some examples, the individual data structures that are managed separately by the applications indicate whether files associated with the application can be safely removed without changing the execution behavior of the applications (e.g., deleting the file safely without breaking application functionality). In this way, techniques of the present disclosure support environments where some applications manage associations individual file associations while other file associations with application are managed centrally. In such environments, advisor applicant 8 can query the centralized datastore, data structures managed individually by the applications, or a combination of the centralized datastore and individually managed data structures (e.g., when some associations are centrally managed while other associations are individually managed by applications).

In an alternative example, each application sends file identifiers of all files on which each respective application has performed a file operation to advisor application 8. Each application further sends a status indicator associated with each file identifier. In such examples, file management module 12 compares each file identifier against file identifiers in other groups. If a match exists between one or more file identifiers, file management module evaluates the status indicator associated with each of the status indicators. If at least one of the status indicators indicates that execution behavior of an application changes when the file associated with the status indicator is inaccessible to the application, file management module 12 indicates that the file identified by the file identifier will not be displayed by display module 14 for deletion. In this way, advisor application 8 queries each of the applications to cross-check application dependencies on a file and determines whether deleting the file would cause execution behavior of the application to change.

In some examples, when applications include functionality of monitoring module 10, file management module 12, and/or display module 14, each application designates files on each the application performs file operations as "private" or "public." A private file may be a file on which only the application itself performs file operations. Public files, by contrast, may be files on which the application and at least one other application perform file operations. In some examples, when advisor application 8 queries each application for file identifiers that identify files which may change execution behavior of an application, the application may not send file identifiers of files designated as private.

As previously mentioned, FIG. 2 is a block diagram illustrating further details of one example of a computing device shown in FIG. 1, in accordance with one or more aspects of the present disclosure. FIG. 2 illustrates one particular example of computing device 2, and many other example embodiments of computing device 2 can be used in other instances.

As shown in the specific example of FIG. 2, computing device 2 includes one or more processors 40, memory 42, a communication unit 44, one or more storage devices 46, input device 4, and output device 6. Computing device 2 also includes an operating system 48 that is executable by computing device 2. Computing device 2, in one example, further includes communication applications 18, advisor application 8, and file information datastore 16. File information datastore further includes file data 50. As shown in FIG. 2, storage devices 46 include files 22 in some examples.

As also shown in FIG. 1, and as previously mentioned in connection with the description of FIG. 1, advisor application 8 of FIG. 2 also includes monitoring module 10, file management module 12, and display module 14. Each of components 40, 42, 44, 46, 48, 4, 6, 18, 8, 10, 12, 14, and 16 may be interconnected (physically, communicatively, and/or operatively) by communication channels 52A-52B for inter-component communications. In some examples, communication channels 52A-52B may be a system bus, network connection, interprocess communication data structure, or any other channel for communicating data.

Processors 40, in one example, are configured to implement functionality and/or process instructions for execution within computing device 2. For example, processors 40 may be capable of processing instructions stored in memory 42 or instructions stored on storage devices 46. In one example, processors 40 execute applications 18 and advisor application 8. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., applications 18) to temporarily store information during program execution.

Computing device 2, in some examples, also includes a communication unit 44. Computing device 2, in one example, utilizes communication unit 44 to communicate with external devices via one or communication channels, such as one or more wired and/or wireless networks. Communication unit 44 can be a network interface card, such as an Ethernet card, an optical transceiver, a radio frequency transceiver, Universal Serial Bus (USB) controller, or any other type of device that can send and receive information. Other examples of such communication units may include 3G and WiFi radios in mobile computing devices.

Storage devices 46, in some examples, also include one or more computer-readable storage media. Storage devices 46 can be configured to store larger amounts of information than memory 42. As shown in FIG. 2, storage devices 26 stores files 22. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in one example, also includes one or more input devices 4. Input device 4, in some examples, is configured to receive input from a user through tactile, audio, or video feedback. Examples of input device 4 include a presence-sensitive screen, a mouse, a keyboard, a voice responsive system, video camera, microphone or any other type of device for detecting a command from a user.

One or more output devices 6 may also be included in computing device 2. Output device 6, in some examples, is configured to provide output to a user using tactile, audio, or video stimuli. Output device 6, in one example, includes a presence-sensitive screen, a sound card, a video graphics adapter card, or any other type of device for converting a signal into an appropriate form understandable to humans or machines. Additional examples of output device 6 include a speaker, a cathode ray tube (CRT) monitor, a liquid crystal display (LCD), organic light emitting diode (OLED) display, or any other type of device that can generate intelligible output to a user.

Computing device 2 may include operating system 48. Operating system 48, in some examples, controls the operation of components of computing device 2. For example, operating system 48, in one example, facilitates the interaction of one or more applications and/or modules with processors 40, memory 42, communication unit 44, storage device 46, input device 4, and output device 6. In various examples, operating system 48 provides an operating environment for applications 18, advisor application 8, and/or file information datastore 16.

Applications 18, advisor application 8, monitoring module 10, file management module 12, and display module 14 shown in FIG. 2 can each include program instructions and/or data that are executable by computing device 2. For example, applications 18, advisor application 8, monitoring module 10, file management module 12, and display module 14 may include instructions that cause computing device 2 to perform one or more of the operations and actions described in the present disclosure. File information datastore 16, in some examples, includes a relational database, Online Analytical Processing (OLAP) database, lookup table, map, or any other suitable data structure for storing data.

Figure 3:
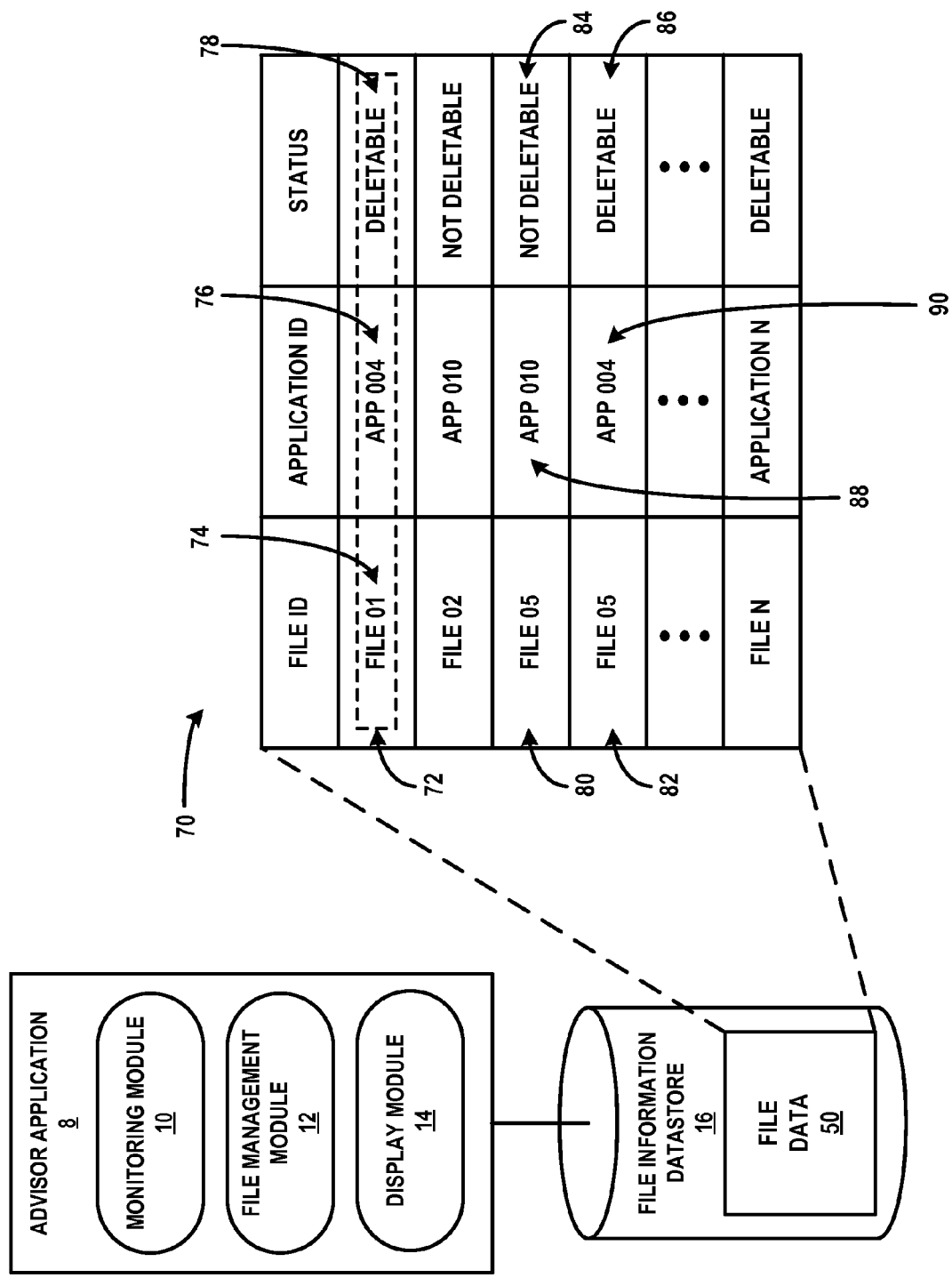
FIG. 3 is a conceptual diagram illustrating file data stored in a file information datastore, in accordance with one or more aspects of the present disclosure.

In accordance with techniques of the disclosure, monitoring module 8 initially detects an indication that one of applications 18 has performed a file operation on one of files 22 stored on storage device 46. Upon receiving the indication, file management module 12 queries file data 50 included in file information datastore 16 to determine whether file data 50 includes an association between an application identifier that identifies the application and a file identifier that identifies the file. For example, the indicator can include the file identifier and application identifier, which is usable by file management module 12 to query file information datastore 16. As shown in FIG. 2 and FIG. 3, file data 50 includes associations between file identifiers, application identifiers and status indicators as described in FIG. 1.

In the current example, file management module 12 determines that file data 50 does not include the association between the file identifier and application identifier. Consequently, file management module 12 stores an association between the file identifier and application identifier in file data 50. In response to storing the association, file management module 12 determines whether execution behavior of the application changes when the file is not accessible to the application. File management module 12 may implement one or more simulation techniques as described in FIG. 1 to determine whether execution behavior of the application changes when the file is not accessible to the application. If the execution behavior of the application changes when the file is not accessible to the application, file management module 12 associates a status indicator with the application identifier and the file identifier in file data 50 to indicate that execution behavior of the application changes when the file is not accessible to the application.

In some examples, file management module 12 uses file attributes associated with files to determine whether a file can be deleted. For instance an attribute such as a file extension of a file can provide information about whether the file may be deleted without changing an application's execution behavior. In another example, an attribute such as a user identifier that identifies a user (e.g., a user name) who modified a file provides information about whether the file can be deleted without change an application's execution behavior. In another example, an attribute such as an origin of the file (e.g., a URL from which the file was received) may similarly provide information about whether the file can be deleted.

In accordance with techniques of the disclosure, file information datastore 16 can include one or more rules applied by file management module 12 to a file to determine whether an attribute associated with the file indicates that the execution behavior of the application changes when the file is not accessible to the application. For instance, a rule may specify an attribute such as a single value (e.g., file extension) or an expression that matches multiple values (e.g., wildcard value). In one example, file management module 12 selects an attribute associated with a file and determining whether the attribute indicates that the execution behavior of the application changes when the file is not accessible to the application. For instance, file management module 12 applies one or more rules to the file and detect whether one or more attributes of the file match one or more of the rules. If one or more attributes match one or more of the rules, file management module 12 associates a status indicator with the application identifier and/or the file identifier stored in file information datastore 16 to indicate that execution behavior of the application changes when the file is not accessible to the application.

In some examples, rules can be configurable based on user input provided by a user. For instance, display module 14 can provide a rule editor that enables the user to create one or more rules that are based on one or more attributes. In other examples, techniques of the disclosure enable file management module 12 may apply a group of rules that are received by computing device 2 using communication unit 44 (e.g., a group of pre-defined rules received from another computing device).

FIG. 3 is a conceptual diagram illustrating file data 50 stored in a file information datastore 16 in accordance with techniques of the present disclosure. FIG. 3 illustrates advisor application 8 as shown in FIGS. 1 and 2, which further includes monitoring module 10, file management module 12, and display module 14. FIG. 3 further includes file information datastore 16 as shown in FIGS. 1 and 2. File information datastore 16 also includes file data. File data 50 is further illustrated conceptually as table 70.

In one example, table 70 may be a table in relational database. Table 70 includes columns that store file identifiers, application identifiers, and status indicators, as shown in FIG. 3. Each row that includes a file identifier, application identifier, and status indicator represents an association 72 between the file identifier, application identifier, and status indicator. For instance, file identifier 74 ("FILE 01") is associated with application identifier 76 ("APP 004"). In one example, file management module 12 stores the association 72 by including file identifier 74 and application identifier 76 in the same row of table 70. In one example, file management module 12 stores association 72 in table 70 when file management module 12 determines that an application identified by application identifier 76 has performed a file operation on a file identified by file identifier 74. If file management module 12 determines that execution behavior of the application changes when the file is not accessible to the application, file management module 12 associates status indicator 78 with association 72, for example, by including status indicator 78 in the same row as file identifier 74 and application identifier 76. By storing associations between each file and application that performs a file operation on the file, and by storing a status indicating whether the file can be deleted, file data 50 enables file management module 12 to provide a user or automated agent with information to intelligently delete files from a computing device.

In some examples, a user may wish to determine which files to delete from a computing device. In examples where multiple applications perform file operations on a single file, file management module 12 may select files to display for deletion that do not change execution behavior of any of the multiple applications. In other words, file management module 12 cross-checks which applications have performed file operations on a file and if execution behavior of all the applications remains unchanged when the file is inaccessible to the applications (e.g., deleted), the file is selected for display to the use as being deletable.

In one example, the user may initially provide a user input to request representations of files for deletion from a computing device. File management module 12 selects a group of file identifiers from table 70, wherein the file identifiers in the group of file identifiers each identify a common file. For instance, file identifiers 80 and 82 each identify a common file "FILE 05." File management module 12 then determines whether each of file identifiers 80 and 82 are associated with status indicators 84 and 86 that indicate execution behavior of applications identified by application identifiers 88 and 90 do not change when common file "FILE 05" is not accessible to the applications.

In the current example, status indicator 84 indicates that execution behavior of application "APP 010" changes when common file "FILE 05" is not accessible to the application. Status indicator 86 indicates that execution behavior of application "APP 004" does not change when common file "FILE 05" is not accessible to the application. Because execution behavior of at least one application associated with "FILE 05" changes when "FILE 05" is inaccessible, file management module 12 does not provide "FILE 05" as deletable to the user. In an alternative example, if both of status indicators 84 and 86 indicated the execution behavior of "APP 010" and "APP 004" do not change when "FILE 05" is inaccessible, file management module 12 selects file identifiers that identify "FILE 05" for display as a deletable file to the user. As described throughout this disclosure, a deletable file may be a file that if inaccessible to an application, causes the execution behavior of the application to change.

Figure 4:
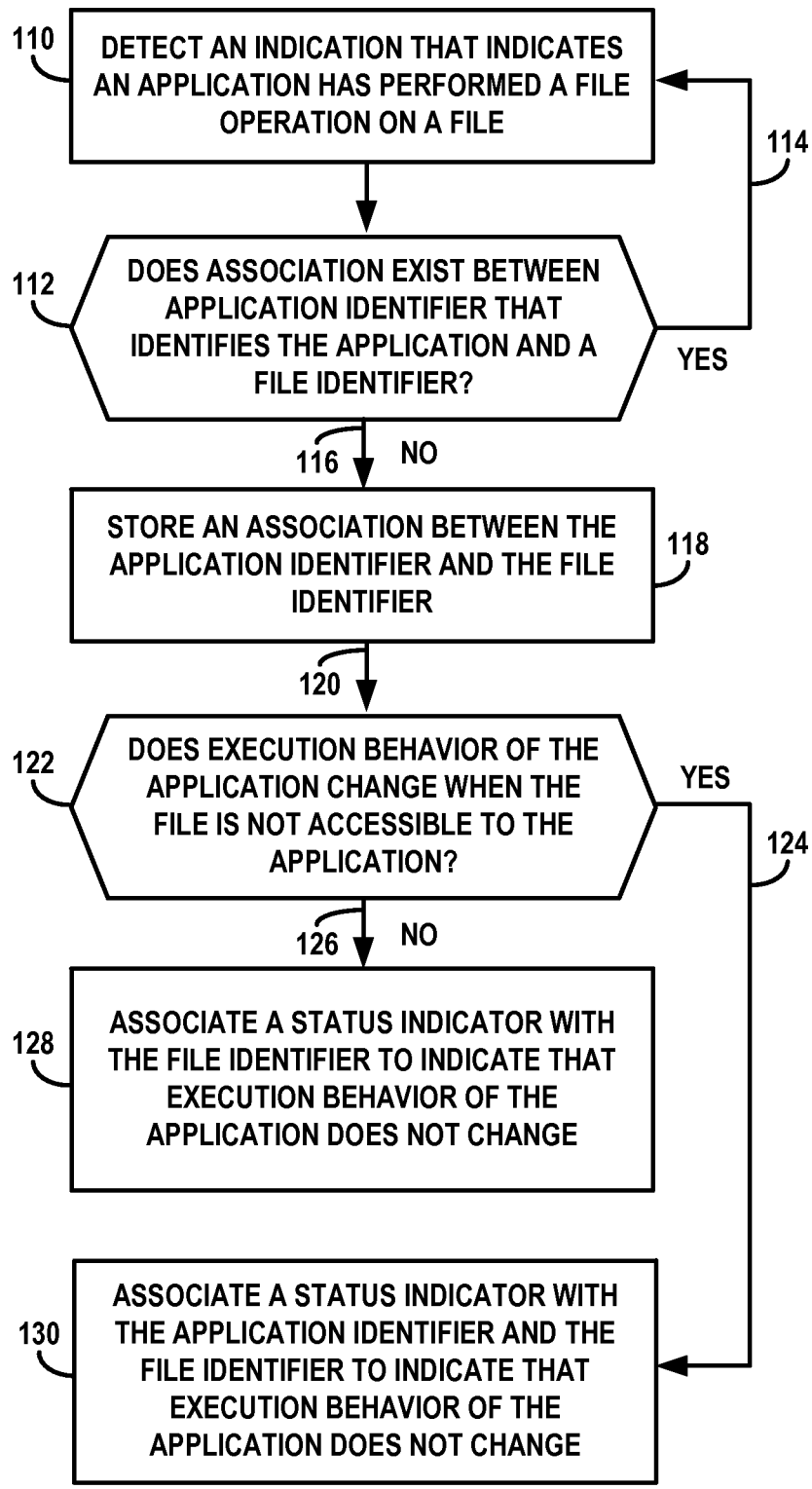
FIG. 4 is a flow diagram that illustrates example operations which may be performed by a computing device, in accordance with techniques of the present disclosure.

FIG. 4 is a flow diagram that illustrates example operations which may be performed by computing device 2 in accordance with techniques of the present disclosure. The operations of FIG. 4 will now be described in reference to advisor application 8 of computing device 2 of FIG. 1. Initially, monitoring module 10 of advisor application 8 detects a file operation indication that an application executing on a computing device has performed a file operation on a file (110).

File management module 12 then determines whether a datastore includes an association between an application identifier that identifies the application and a file identifier that identifies the file (112). When file management module 12 determines that the datastore includes the association between the application identifier and the file identifier (114), file management module 12 continues to detect further indications of file operations (110). When file management module 12 determines that the datastore does not include the association between the application identifier and the file identifier (116), file management module 12 stores the association between the application identifier and the file identifier.

In response to storing the association in the datastore, file management module 12 determines whether execution behavior of the application changes when the file is not accessible to the application (122). If execution behavior of the application changes when the file is not accessible to the application (124), file management module 12 associates a status indicator with the application identifier and/or the file identifier to indicate that execution behavior of the application changes when the file is not accessible to the application (130). In another example, execution behavior of the application does not change when the file is not accessible to the application (126), file management module 12 associates a status indicator with the association between the application identifier and the file identifier to indicate that execution behavior of the application does not change when the file is not accessible to the application (128).

In some examples of the operations as shown in FIG. 4, the file operation is an operation selected from a group consisting of creating, modifying, reading, and deleting the file. In some examples, the operations include terminating, by the computing device, execution of the application; causing, by the computing device, the file to be inaccessible to the application; in response to causing the file to be inaccessible to the application, executing, by the computing device, the application; and detecting, by the computing device, whether the application provides an indication that at least one of a notification, warning and error associated with the application.

In some examples, the operations include receiving, by the computing device, a request to display representations of files for deletion; in response to receiving the request, querying, by the computing device, the datastore to select a subset of the files, wherein the subset of the files are associated with status indicators indicating that execution behavior of applications associated with the subset of the files do not change when the subset of the files are not accessible to the applications; and displaying, by the computing device, representations associated with files of the subset of files. In some examples, the operations include receiving, by the computing device, a user input to select, at least one of the representations associated with the files of the subset of files; and in response to receiving the user input, deleting, by the computing device a file associated with the at least one selected representation.

In some examples, the operations include selecting, by the computing device, a group of file identifiers from the datastore, wherein the file identifiers in the group of file identifiers each identify a common file; determining, by the computing device, whether each of the file identifiers are associated with status indicators that indicate execution behavior of applications associated with the file identifiers do not change when the common file is not accessible to the applications; and selecting, by the computing device, the group of file identifiers as the subset of files. In some examples, the file is stored on a remote computing device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that modules and components included in the figures of this disclosure are illustrated in various configurations and arrangements for example purposes. Such modules and components may be distributed among one or more computing devices in different example configurations and arrangements to perform the techniques as described herein. As such, the example configurations and arrangements of the components as shown in the various figures should not be interpreted as the only such possible configurations and arrangements to perform the techniques of the disclosure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments have been described. These and other embodiments are within the scope of the following claims.

What is claimed is:

1. A method comprising:
   in response to a determining, by a computing device, that an application has performed a file operation on a file, storing, by the computing device, an association between an application identifier of the application and a file identifier of the file, wherein the file identifier of the file uniquely identifies the file;
   determining, by the computing device, whether an execution behavior of the application changes when the file is inaccessible to the application, wherein the execution behavior of the application changes at least when the application provides one or more of a notification, a warning, and an error; and
   in response to a determining, by the computing device, that an execution behavior of the application does not change when the file is inaccessible to the application, associating a status indicator with the file identifier of the file to indicate that the execution behavior of the application does not change if the file is deleted.

2. The method of claim 1, wherein the file operation is any one of creating, modifying, reading, and deleting the file.

3. The method of claim 1, further comprising simulating execution of the application without access to the file, wherein the simulating comprises:
   causing, by the computing device, the file to be inaccessible to the application; and
   in response to causing the file to be inaccessible to the application, executing, by the computing device, the application to determine whether the execution behavior of the application changes while the file is inaccessible.

4. The method of claim 1, further comprising:
   displaying, by the computing device, a graphical representation of the file based at least in part on the status indicator indicating that the execution behavior of the application does not change if the file is deleted.

5. The method of claim 4, further comprising:
   in response to receiving a selection of the displayed graphical representation of the file, deleting, by the computing device, the file.

6. The method of claim 4, further comprising:
   selecting, by the computing device, a group of file identifiers from a datastore, wherein the file identifiers in the group of file identifiers each identify a unique common file;
   determining, by the computing device, whether the file identifiers are associated with status indicators that indicate an execution behavior of applications associated with the file identifiers do not change if the unique common file is deleted; and
   responsive to determining that the execution behavior of the applications associated with the file identifiers do not change if the unique common file is deleted, selecting, by the computing device, the group of file identifiers.

7. The method of claim 1, further comprising:
   selecting, by the computing device, an attribute associated with the file;
   determining, by the computing device, whether the attribute indicates that the execution behavior of the application changes when the file is inaccessible to the application; and
   when the attribute indicates that the execution behavior of the application changes, associating, by the computing device, the status indicator with the file identifier to indicate that execution behavior of the application changes if the file is deleted.

8. The method of claim 1, wherein the file is stored on a remote computing device.

9. A computing device, comprising:
one or more processors; and
a file management module executable by the one or more processors to, in response to determining that an application has performed a file operation on a file, stores an association between an application identifier of the application and a file identifier of the file, wherein the file identifier of the file uniquely identifies the file;
wherein the file management module is executable by the one or more processors to:
determine whether an execution behavior of the application changes when the file is inaccessible to the application, wherein the execution behavior of the application changes at least when the application provides one or more of a notification, a warning, and an error; and
in response to a determining that an execution behavior of the application does not change when the file is inaccessible to the application, associate a status indicator with the file identifier of the file to indicate that the execution behavior of the application does not change if the file is deleted.

10. The computing device of claim 9,
wherein the file operation is any one of creating, modifying, reading, and deleting the file.

11. The computing device of claim 9, wherein the file management module is executable by the one or more processors to:
cause the file to be inaccessible to the application; and
execute the application in response to causing the file to be inaccessible to the application, in response to causing the file to be inaccessible to the application to determine whether the execution behavior of the application changes while the file is inaccessible.

12. The computing device of claim 9, further comprising:
wherein a display module is executable by the one or more processors to display a graphical representation of the file based at least in part on the status indicator indicating that the execution behavior of the application does not change if the file is deleted.

13. A computer program product comprising a non-transitory computer-readable storage medium having computer-readable program code embodied therein, the computer-readable program code comprising:
computer-readable program code to, in response to determining that an application has performed a file operation on a file, store an association between an application identifier of the application and a file identifier of the file, wherein the file identifier of the file uniquely identifies the file;
computer-readable program code to determine whether an execution behavior of the application changes when the file is inaccessible to the application, wherein the execution behavior of the application changes at least when the application provides one or more of a notification, a warning, and an error; and
computer-readable program code to, in response to a determining that an execution behavior of the application does not change when the file is inaccessible to the application, associate a status indicator with the file identifier of the file to indicate that the execution behavior of the application does not change if the file is deleted.

14. The computer program product of claim 13, wherein the file operation is any one of creating, modifying, reading, and deleting the file.

15. The computer program product of claim 13, wherein the computer-readable program code comprises:
computer-readable program code to cause the file to be inaccessible to the application; and
computer-readable program code to execute the application in response to causing the file to be inaccessible to the application to determine whether the execution behavior of the application changes while the file is inaccessible.

16. The computer program product of claim 13, wherein the computer-readable program code comprises:
computer-readable program code to display graphical representation of the file based at least in part on the status indicator indicating that the execution behavior of the application does not change if the file is deleted.

17. The computer program product of claim 16, wherein the computer-readable program code comprises:
computer-readable program code to delete, in response to receiving a selection of the displayed graphical representation of the file.

18. The computer program product of claim 16, wherein the computer-readable program code comprises:
computer-readable program code to select a group of file identifiers from a datastore, wherein the file identifiers in the group of file identifiers each identify a unique common file;
computer-readable program code to determine whether the file identifiers are associated with status indicators that indicate an execution behavior of applications associated with the file identifiers do not change if the unique common file is deleted; and
computer-readable program code to, responsive to determining that the execution behavior of the applications associated with the file identifiers do not change if the unique common file is deleted, select the group of file identifiers.

19. The computer program product of claim 13, wherein the computer-readable program code comprises:
computer-readable program code to select an attribute associated with the file;
computer-readable program code to determine whether the attribute indicates that the execution behavior of the application changes when the file is inaccessible to the application; and
computer-readable program code to associate the status indicator with the file identifier to indicate that execution behavior of the application changes if the file is deleted when the attribute indicates that the execution behavior of the application changes.

20. The computer program product of claim 13, wherein the file is stored on a remote computing device.

* * * * *